J. NOLAN.
NUT LOCK.
APPLICATION FILED APR. 14, 1914.
1,215,971.
Patented Feb. 13, 1917.
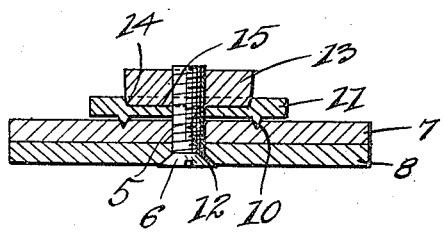
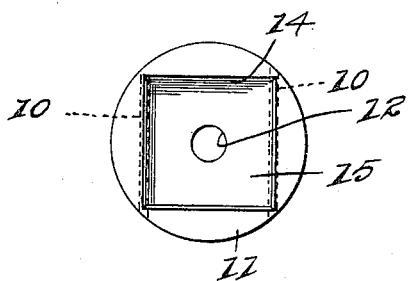
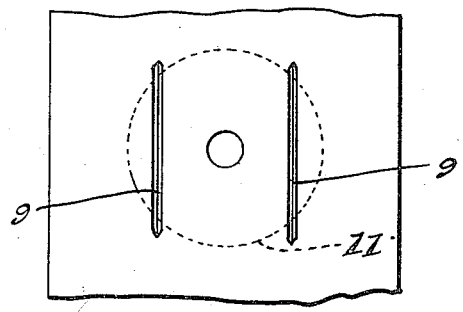
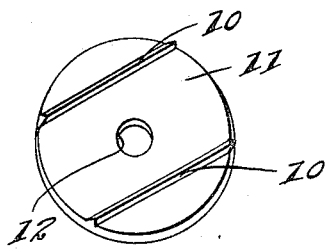
Witnesses
C. R. Bealle.
Inventor
J. Nolan.
By
Attorney

UNITED STATES PATENT OFFICE.

JOHN NOLAN, OF MOLINE, ILLINOIS.

NUT-LOCK.

1,215,971.　　　Specification of Letters Patent.　　Patented Feb. 13, 1917.

Application filed April 14, 1914. Serial No. 831,804.

*To all whom it may concern:*

Be it known that I, JOHN NOLAN, a citizen of the United States, residing at Moline, in the county of Rock Island and State of Illinois, have invented certain new and useful Improvements in Nut-Locks, of which the following is a specification.

This invention relates to nut locks, and more particularly to a nut locking washer of simple and inexpensive construction.

The invention has for its object to provide a lock washer which will effectively hold the nut against rotation with relation to an object, while the bolt or screw is being adjusted.

Another object is the provision of a lock washer having object-engaging ribs which are so arranged as to prevent breakage or splitting of woodwork, when the washer is used in connection with furniture or other wooden objects.

With these and other objects in view, the invention consists in the novel construction, arrangement and formation of parts, as will be hereinafter specifically described, claimed and illustrated in the accompanying drawings, in which, Figure 1 represents a transverse central sectional view through the nut lock applied to use, Fig. 2 represents a top plan view of the locking washer, Fig. 3 represents a bottom plan view thereof, Fig. 4 represents a plan view of the washer engaging face of the clamped object, showing the parallel grooves therein adapted to receive the ribs of the washer.

Referring to the drawing in detail, wherein similar reference numerals designate corresponding parts throughout the several views, the numeral 5 indicates a bolt of any approved type having a suitable head 6 at one end and formed with suitable threads on the the shank thereof. The objects to be clamped on bolt are indicated by the numerals 7 and 8 and the shank of the bolt 5 is positioned through a suitable opening therein. The object 7 is formed on its outer face with a pair of parallel grooves 9 adapted to receive the parallel ribs 10 formed on the under face of the lock washer 11 formed with a suitable central opening 12 adapted to receive the shank of the bolt 5.

A nut 13 is adapted to coöperate with the threaded shank of the bolt 5 and secure the objects 7 and 8 and the inner edges 14 thereof are beveled, as shown in Fig. 1. The inner portion of the nut 13 is adapted to seat in a depression 15 formed in the outer face of the washer 11 and shaped conformably with the nut 13. The approximate depth of the depression 15 as compared with the thickness of the washer 11 is shown in Fig. 1.

In use, the bolt 5 is positioned through the objects 7 and 8, and the washer 11 is slipped upon the threaded terminal of the bolt and the ribs 10 thereof are engaged in the grooves 9 in the object, thus securing the washer against rotary movement with relation to the object. The nut 13 is subsequently fitted upon the terminal of the bolt and the latter is moved longitudinally until the nut is snugly fitted in the depression 15, the walls of which secure the nut against rotary movement with relation to the washer. The nut being thus held against rotary movement with relation to the objects 7 and 8, the bolt 5 may be adjusted by a suitable tool applied to the head 6, so as to firmly clamp the objects 7 and 8 between the bolt head and the nut 13. The ribs 10 on the washer are arranged directly under and in parallel relation to two of the opposed side walls of the depression 14, so as to insure against breakage of the objects 7 and 8 due to the strain exerted by the ribs 10 engaging the object on opposite sides of the bolt-receiving aperture therein. The screw or bolt 5 may be conveniently tightened or adjusted from time to time by a suitable tool applied to the head 6, and the nut is securely held against rotary movement with relation to the objects during adjustment thereof by the washer 11.

What I claim is:—

In combination, a bolt, a head at one end of said bolt, a nut fitted upon the bolt, a circular washer positioned upon the bolt in advance of the nut having a flat inner object-engaging face, and a depression in the outer face shaped conformably with and non-rotatably receiving the nut, and spaced parallel ribs formed on the inner face of the nut underlying and parallel with two of the opposed side walls of the depression and the corresponding side faces of the nut.

In testimony whereof I affix my signature in presence of two witnesses.

JOHN NOLAN.

Witnesses:
W. S. McClurg,
Ruth Nelson.

Copies of this patent may be obtained for five cents each, by addressing the "Commissioner of Patents, Washington, D. C."